3,179,525
DIELECTRIC MATERIALS
Frank Ernest Welsby and George Girdley Blowers, Great Yarmouth, England, assignors to Erie Resistor Limited, Great Yarmouth, England
Filed Nov. 17, 1961, Ser. No. 153,104
7 Claims. (Cl. 106—39)

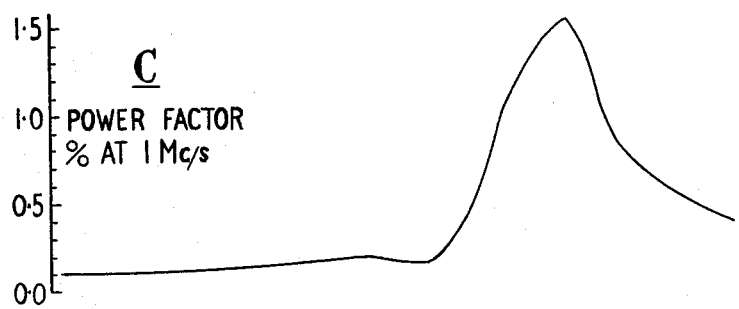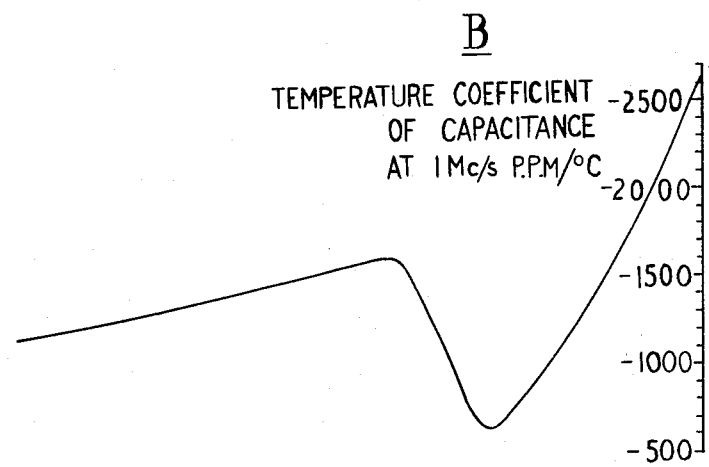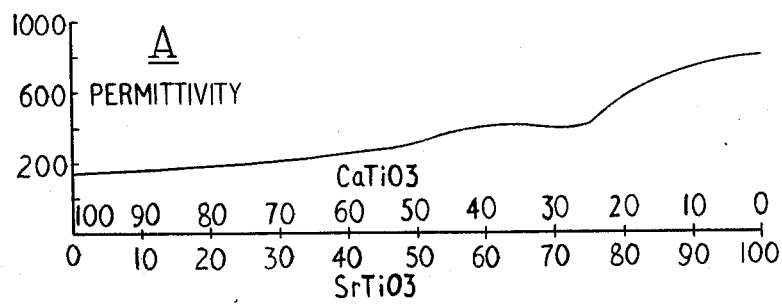

The object of this invention is to prepare dielectric materials of the kind having a permittivity in the range 100 to 1000, having non-ferro-electric properties from —50° to +100° C. and having a substantially linear negative temperature coefficient of permittivity of between 750 and 3000 p.p.m. per degree C.

Previous dielectrics with similar characteristics have much lower permittivity for the equivalent temperature coefficient and are therefore limited in the capacitance which can be obtained in a given physical size.

According to this invention there is provided a dielectric material of the kind referred to comprising bismuth titanate with strontium titanate and/or calcium titanate. Preferably the proportion of bismuth titanate is about 35% by weight.

Capacitors made using the dielectric materials according to this invention are especially useful when a substantially linear temperature coefficient of capacitance is desired together with a low power factor and a small physical size. In particular, in modern miniaturised radio receivers (transistor portables) where space is at a premium, the aforesaid capacitors can be used as the tuning capacitors in signal and intermediate frequency circuits, in which low losses and stable characteristics are essential.

The following table illustrates some dielectric material compositions according to this invention.

Table

| | Composition (wt. percent) | Permittivity K | Temp. coeff., p.p.m./° C. | Power Factor, percent |
|---|---|---|---|---|
| 1 | 35 Bismuth titanate<br>65 Calcium titanate | 150 | —1,030 | 0.1 |
| 2 | 35 Bismuth titanate<br>65 Strontium titanate | 840 | —2,800 | 0.4 |
| 3 | 35 Bismuth titanate<br>58.5 Calcium titanate<br>6.5 Strontium titanate | 188 | —1,140 | 0.1 |
| 4 | 35 Bismuth titanate<br>48.8 Calcium titanate<br>16.2 Strontium titanate | 210 | —1,330 | 0.1 |

Variation (by way of increase or of decrease) of the proportion of bismuth titanate (having the approximate formula $Bi_2O_3 \cdot 2TiO_2$) in any of the above groups results in a body having similar temperature characteristics, but of lower permittivity, which may be of advantage under certain circumstances.

The dielectric material according to this invention may be prepared in accordance with any known practice for the production of ceramic dielectrics. In one convenient method, the starting materials, for example the bismuth titanate and strontium titanate, which may or may not be precalcined, are thoroughly mixed with water and a suitable binding agent; the ceramic piece is then formed by a method selected according to the shape desired, for example by pressing or extrusion, and the piece is dried and fired to vitrification at a temperature of from 1000° to 1200° C., the temperature depending on the composition used.

It will be understood that the mixed titanates of the invention may be prepared by any convenient route. Thus, the individual basic oxides or carbonates may be employed, or the preformed individual titanates, or any combination of these giving the correct composition.

It has been found that particularly favourable, low power losses are obtained, in the preferred case where the proportion of bismuth titanate is about 35%, when the proportion of strontium titanate in the remainder, that is, the proportion of strontium titanate to calcium titanate, is outside the approximate range 63–90%. Within this range, the power factor will generally exceed about 0.6. This is shown in the accompanying graphs A, B and C in which, respectively the permittivity, temperature coefficient of capacitance at 1 mc./s. in p.p.m./° C., and power factor present at 1 mc./s. are plotted against the composition of N (wt. percent) in the formulation 35 ($Bi_2O_3 \cdot 2TiO_2$) 65N.

We claim:
1. A ceramic dielectric material consisting essentially of about 35% by weight of bismuth titanate, together with alkaline earth titanate selected from the group consisting of strontium titanate and calcium titanate.
2. A ceramic dielectric material consisting essentially of about 35% by weight of bismuth titanate and about 65% by weight of mixed alkaline earth titanate, said mixed alkaline earth titanate consisting of up to 63% of strontium titanate, the balance being calcium titanate.
3. A ceramic dielectric material consisting of about 35% by weight of bismuth titanate and about 65% by weight of mixed alkaline earth titanate, said mixed alkaline earth titanate consisting of strontium and calcium titanates at least 90% thereof being strontium titanate.
4. A ceramic dielectric material consisting of about 35% by weight of bismuth titanate and about 65% by weight of calcium titanate.
5. A caramic dielectric material consisting of about 35% by weight of bismuth titanate and about 65% by weight of strontium titanate.
6. A ceramic dielectric material consisting of about 35% by weight of bismuth titanate, about 58.5% by weight of calcium titanate and about 6.5% by weight of strontium titanate.
7. A ceramic dielectric material consisting of about 35% by weight of bismuth titanate, about 48.8% by weight of calcium titanate and about 16.2% by weight of strontium titanate.

References Cited by the Examiner
UNITED STATES PATENTS 3,069,276  12/62  Domanski _____ 106—39
3,074,804  1/63  Planer et al. _____ 106—39

FOREIGN PATENTS 450,945  8/48  Canada.
574,577  1/46  Great Britain.

OTHER REFERENCES

Baldwin: Ceramic Industry, August 1958, "How to Use Electronic Ceramics Better," pages 88–92.

TOBIAS E. LEVOW, *Primary Examiner.*

JOSEPH REBOLD, *Examiner.*